US009280301B2

(12) United States Patent
Bao et al.

(10) Patent No.: US 9,280,301 B2
(45) Date of Patent: Mar. 8, 2016

(54) METHOD AND DEVICE FOR RECOVERING ERRONEOUS DATA

(71) Applicant: Huawei Technologies Co., Ltd., Shenzhen (CN)

(72) Inventors: Huiqiang Bao, Shenzhen (CN); Dayong Wang, Hangzhou (CN); Rongsheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/501,368

(22) Filed: Sep. 30, 2014

(65) Prior Publication Data
US 2015/0067443 A1 Mar. 5, 2015

Related U.S. Application Data

(63) Continuation of application No. PCT/CN2014/073234, filed on Mar. 11, 2014.

(30) Foreign Application Priority Data

Aug. 28, 2013 (CN) .......................... 2013 1 0381426

(51) Int. Cl.
*G11C 29/00* (2006.01)
*G06F 3/06* (2006.01)
*G06F 11/10* (2006.01)

(52) U.S. Cl.
CPC ............ *G06F 3/0689* (2013.01); *G06F 3/0619* (2013.01); *G06F 3/0647* (2013.01); *G06F 11/108* (2013.01); *G06F 11/1048* (2013.01)

(58) Field of Classification Search
USPC .................................. 714/764, 770; 711/114
See application file for complete search history.

(56) References Cited

U.S. PATENT DOCUMENTS

2004/0073846 A1 4/2004 Nakanishi et al.
2010/0070686 A1* 3/2010 Mergler et al. ............... 711/103

(Continued)

FOREIGN PATENT DOCUMENTS

CN 1498371 A 5/2004
CN 102479555 A 5/2012

(Continued)

OTHER PUBLICATIONS

Foreign Communication From a Counterpart Application, European Application No. 14772049.4, Extended European Search Report dated Apr. 13, 2015, 11 pages.

(Continued)

*Primary Examiner* — Guy Lamarre
(74) *Attorney, Agent, or Firm* — Conley Rose, P.C.; Grant Rodolph; Adam J. Stegge

(57) ABSTRACT

A method for recovering erroneous data is disclosed, the method includes: when data in a storage block that is included in a solid state disk (SSD) is read, performing a first error check on data on a certain page of the storage block to acquire erroneous data on the page; if a first number of pieces of the erroneous data on the page is smaller than or equal to a preset first threshold, performing an error checking and correction (ECC) recovery on the data on the page; and if the first number is greater than the preset first threshold, acquiring data from spare space according to a storage position of the erroneous data on the page and a fixed entry corresponding to the storage block, and replacing the erroneous data on the page with the acquired data, where the fixed entry includes a storage position of each data stored in the spare space.

20 Claims, 5 Drawing Sheets

(56) References Cited

U.S. PATENT DOCUMENTS

2012/0127813 A1    5/2012    Jeong et al.
2013/0159603 A1*   6/2013    Whitney ........................ 711/103

FOREIGN PATENT DOCUMENTS

CN        102592680 A    7/2012
CN        103455386 A    12/2013

OTHER PUBLICATIONS

Partial English Translation and Abstract of Chinese Patent Application No. CN103455386A, Oct. 28, 2014, 3 pages.

Partial English Translation and Abstract of Chinese Patent Application No. CN102592680A, Dec. 22, 2014, 6 pages.

Partial English Translation and Abstract of Chinese Patent Application No. CN102592680A, Oct. 28, 2014, 3 pages.

Foreign Communication From a Counterpart Application, PCT Application No. PCT/CN20141073234, International Search Report dated Jun. 11, 2014, 7 pages.

Foreign Communication From a Counterpart Application, PCT Application No. PCT/CN20141073234, Written Opinion dated Jun. 11, 2014, 5 pages.

Foreign Communication From a Counterpart Application, Chinese Application No. 201310381426.1, Chinese Office Action dated Aug. 12, 2015, 7 pages.

* cited by examiner

METHOD AND DEVICE FOR RECOVERING ERRONEOUS DATA

CROSS-REFERENCE TO RELATED APPLICATIONS

This application is a continuation of International Application No. PCT/CN2014/073234, filed on Mar. 11, 2014, which claims priority to Chinese Patent Application No. 201310381426.1, filed on Aug. 28, 2013, both of which are hereby incorporated by reference in their entireties.

TECHNICAL FIELD

The present invention relates to the field of computers, and in particular to, a method and device for recovering erroneous data.

BACKGROUND

A solid state disk (SSD) is a hard disk manufactured by using a solid-state electronic memory chip array, and is formed by a control unit and a storage unit. The storage unit is formed by a Flash chip. Due to factors of process and cost, a certain fault rate is caused to the Flash chip; when a Flash chip fails, stored data is damaged. Therefore, a method for recovering erroneous data is widely concerned.

At present, a method for recovering erroneous data is that: when data in a storage block that is included in a Flash chip of an SSD is read, for a certain page in the storage block, erroneous data on the page is checked. If the number of pieces of erroneous data does not exceed a preset first threshold, an error checking and correction (ECC) recovery is performed on the erroneous data on the page and correct data is returned. If the number of pieces of erroneous data exceeds the preset first threshold, the storage block is labeled as a bad block and the storage block will not be used subsequently. Meanwhile, a page having a same page identity as that of the page is selected from a preset number of storage blocks and, it is determined, according to data on the selected page, whether a redundant array of independent disks (RAID) recovery can be performed on the data of the page. If it is determined to perform a RAID recovery on the data of the page, a RAID recovery is performed on the page and correct data is returned; otherwise, data reading is wrong.

In a process of implementing the present invention, the inventor finds the prior art at least has the following problems.

When the number of pieces of erroneous data on a certain page exceeds the preset first threshold, only a RAID recovery can be performed on the storage block. However, a RAID recovery needs to be performed according to the data in the preset number of storage blocks, and time for recovering data is long and efficiency is low. Moreover, after the whole storage block is labeled as a bad block, a capacity of the SSD is reduced, and only a storage block not labeled as a bad block can be used subsequently, which causes that the storage block not labeled as a bad block is frequently used, thereby shortening a service life and deteriorating performance of the SSD.

SUMMARY

To solve the problems of the prior art, embodiments of the present invention provide a method and device for recovering erroneous data. The technical solution is as follows.

A first aspect provides a method for recovering erroneous data, including, when data in a storage block that is included in an SSD is read, performing a first error check on data on a certain page of the storage block to acquire erroneous data on the page; if a first number of pieces of the erroneous data on the page is smaller than or equal to a preset first threshold, performing an error checking and correction (ECC) recovery on the data on the page; and if the first number is greater than the preset first threshold, acquiring data from spare space according to a storage position of the erroneous data on the page and a fixed entry corresponding to the storage block, and replacing the erroneous data on the page with the acquired data, where the fixed entry includes a storage position of each data stored in the spare space.

With reference to the first aspect, in a first possible implementation manner of the foregoing first aspect, after the acquiring data from spare space according to a storage position of the erroneous data on the page and a stored fixed entry, and replacing the erroneous data on the page with the acquired data if the first number is greater than the preset first threshold, the method further includes performing a second error check on the data on the page to acquire the erroneous data on the page; if a second number of pieces of the erroneous data on the page is smaller than or equal to the preset first threshold, performing an ECC recovery on the data on the page; if the second number is greater than the preset first threshold, labeling the storage block as a bad block and, according to a page identity of the page, acquiring data from a preset number of storage blocks; and determining whether to perform a RAID recovery on the data on the page according to the acquired data; and if it is determined to perform a RAID recovery on the data on the page according to the acquired data, performing a RAID recovery on the data on the page.

With reference to the first aspect, in a second possible implementation manner of the foregoing first aspect, after the performing a first error check on data on a certain page of the storage block to acquire the erroneous data on the page, the method further includes acquiring a storage position of erroneous data on each page in the storage block; acquiring erroneous data in a same storage position, and counting the number of errors in the erroneous data in a same storage position; and selecting a first preset number of storage positions with the greatest number of errors, and storing the selected storage positions in a temporary entry corresponding to the storage block.

With reference to the first aspect, in a third possible implementation manner of the foregoing first aspect, after the performing a first error check on data on a certain page of the storage block to acquire the erroneous data on the page, the method further includes acquiring erroneous data in each storage position on the page; counting the number of errors in the erroneous data in each storage position on the page according to the erroneous data in each storage position on the page; and selecting a first preset number of storage positions with the greatest number of errors, and storing the selected storage positions and a page identity of the page in a temporary entry corresponding to the storage block.

With reference to the first aspect, in a fourth possible implementation manner of the foregoing first aspect, after the performing a first error check on data on a certain page of the storage block to acquire the erroneous data on the page, the method further includes acquiring a storage position of erroneous data on each page in the storage block; acquiring erroneous data in a same storage position, and counting the number of errors in the erroneous data in a same storage position; and selecting a second preset number of storage positions from the storage positions of the erroneous data in the storage block according to the number of errors counted, and storing the selected storage positions and a page identity corresponding to the selected storage positions in a temporary entry corresponding to the storage block.

With reference to the first aspect or any one possible implementation manner from the first possible implementation manner of the first aspect to the fourth possible implementation manner of the first aspect, in a fifth possible implementation manner of the foregoing first aspect, after the performing an ECC recovery on the data on the page if a second number of pieces of the erroneous data on the page is smaller than or equal to the preset first threshold, the method further includes acquiring an idle storage block in the SSD, and moving the data in the storage block to the idle storage block according to a fixed entry corresponding to the idle storage block.

With reference to the fifth possible implementation manner of the foregoing first aspect, in a sixth possible implementation manner of the foregoing first aspect, the method further includes replacing the fixed entry corresponding to the storage block with the temporary entry corresponding to the storage block.

Another aspect provides a device for recovering erroneous data, including: a first acquiring module configured to, when data in a storage block that is included in an SSD is read, perform a first error check on data on a certain page of the storage block to acquire erroneous data on the page; a first recovering module configured to, if a first number of pieces of the erroneous data on the page is smaller than or equal to a preset first threshold, perform an ECC recovery on the data on the page; and a first replacing module configured to, if the first number is greater than the preset first threshold, acquire data from spare space according to a storage position of the erroneous data on the page and a fixed entry corresponding to the storage block, and replace the erroneous data on the page with the acquired data, where the fixed entry includes a storage position of each data stored in the spare space.

With reference to a second aspect, in a first possible implementation manner of the foregoing second aspect, the device further includes: a second acquiring module configured to perform a second error check on the data on the page to acquire the erroneous data on the page; a second recovering module configured to, if a second number of pieces of the erroneous data on the page is smaller than or equal to the preset first threshold, perform the ECC recovery on the data on the page; a labeling module configured to, if the second number is greater than the preset first threshold, label the storage block as a bad block and, according to a page identity of the page, acquire data from a preset number of storage blocks; and a third recovering module configured to determine whether to perform a RAID recovery on the data on the page according to the acquired data; and if it is determined to perform a RAID recovery on the data on the page according to the acquired data, perform a RAID recovery on the data on the page.

With reference to the second aspect, in a second possible implementation manner of the foregoing second aspect, the device further includes: a third acquiring module configured to acquire a storage position of erroneous data on each page in the storage block; a first counting module configured to acquire erroneous data in a same storage position, and count the number of errors in the erroneous data in a same storage position; and a first storing module configured to select a first preset number of storage positions with the greatest number of errors, and store the selected storage positions in a temporary entry corresponding to the storage block.

With reference to the second aspect, in a third possible implementation manner of the foregoing second aspect, the device further includes: a fourth acquiring module configured to acquire erroneous data in each storage position on the page; a second counting module configured to count the number of errors in the erroneous data in each storage position on the page according to the erroneous data in each storage position on the page; and a second storing module configured to select a first preset number of storage positions with the greatest number of errors, and store the selected storage positions and a page identity of the page in a temporary entry corresponding to the storage block.

With reference to the second aspect, in a fourth possible implementation manner of the foregoing second aspect, the device further includes: a fifth acquiring module configured to acquire a storage position of erroneous data on each page in the storage block; a third counting module configured to acquire erroneous data in a same storage position, and count the number of errors in the erroneous data in a same storage position; and a third storing module configured to select a second preset number of storage positions from the storage positions of the erroneous data in the storage block according to the number of errors counted, and store the selected storage positions and a page identity corresponding to the selected storage positions in a temporary entry corresponding to the storage block.

With reference to the second aspect or any one possible implementation manner from the first possible implementation manner of the second aspect to the fourth possible implementation manner of the second aspect, in a fifth possible implementation manner of the foregoing second aspect, the device further includes a moving module configured to acquire an idle storage block in the SSD, and move the data in the storage block to the idle storage block according to a fixed entry corresponding to the idle storage block.

With reference to the fifth possible implementation manner of the foregoing second aspect, in a sixth possible implementation manner of the foregoing second aspect, the device further includes a second replacing module configured to replace the fixed entry corresponding to the storage block with the temporary entry corresponding to the storage block.

A third aspect provides a device for recovering erroneous data, which includes a memory and a processor used to perform a method for recovering erroneous data.

In the embodiments of the present invention, a first error check is performed on data on a certain page of a storage block, and when the data on the page cannot be corrected by using a first ECC, erroneous data is replaced with data stored in spare space of the page. Data having a high error probability is stored in the spare space of out of band (OOB) space of each page, which not only makes full use of the OOB space, but also replaces the erroneous data with the data stored in the spare space of the page. A probability of occurrence of uncorrectable faults may be greatly decreased, so as to avoid simply labeling the storage block as a bad block.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present invention in detail with reference to the accompanying drawings.

Figure 1:
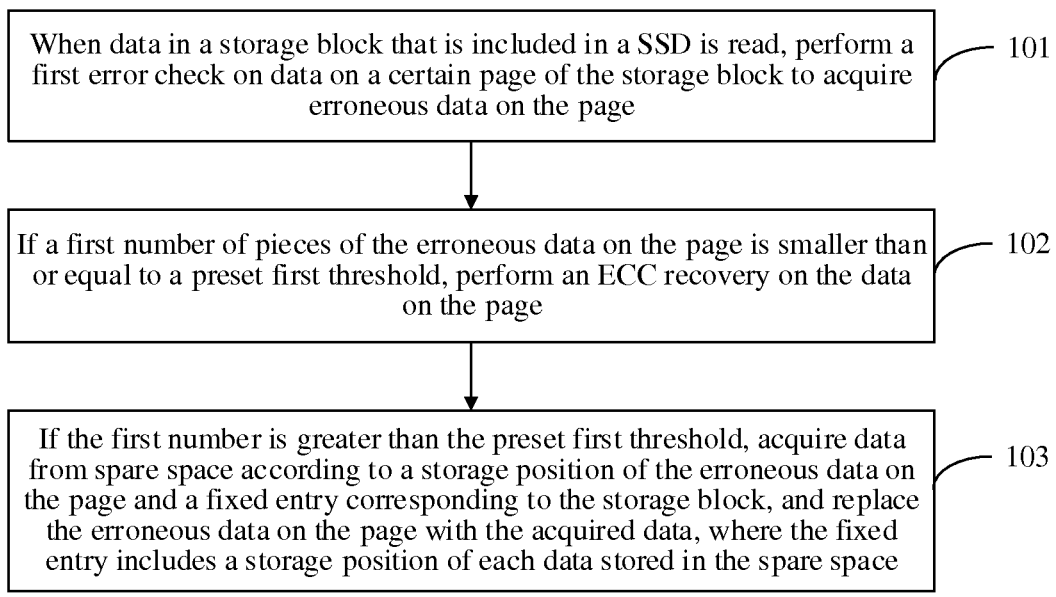
FIG. 1 is a flowchart of a method for recovering erroneous data according to an embodiment of the present invention.

An embodiment of the present invention provides a method for recovering erroneous data. With reference to FIG. 1, the method includes:

Step 101: When data in a storage block that is included in an SSD is read, perform a first error check on data on a certain page of the storage block to acquire erroneous data on the page.

Step 102: If a first number of pieces of the erroneous data on the page is smaller than or equal to a preset first threshold, perform an ECC recovery on the data on the page.

Step 103: If the first number is greater than the preset first threshold, acquire data from spare space according to a storage position of the erroneous data on the page and a fixed entry corresponding to the storage block, and replace the erroneous data on the page with the acquired data, where the fixed entry includes a storage position of each data stored in the spare space.

In the embodiment of the present invention, a first error check is performed on data on a certain page of a storage block, and when the data on the page cannot be corrected by using a first ECC, erroneous data is replaced with data stored in spare space of the page. Data having a high error probability is stored in the spare space of OOB space of each page, which not only makes full use of the OOB space, but also replaces the erroneous data with the data stored in the spare space of the page. A probability of occurrence of uncorrectable faults may be greatly decreased, so as to avoid simply labeling the storage block as a bad block.

Figure 2:
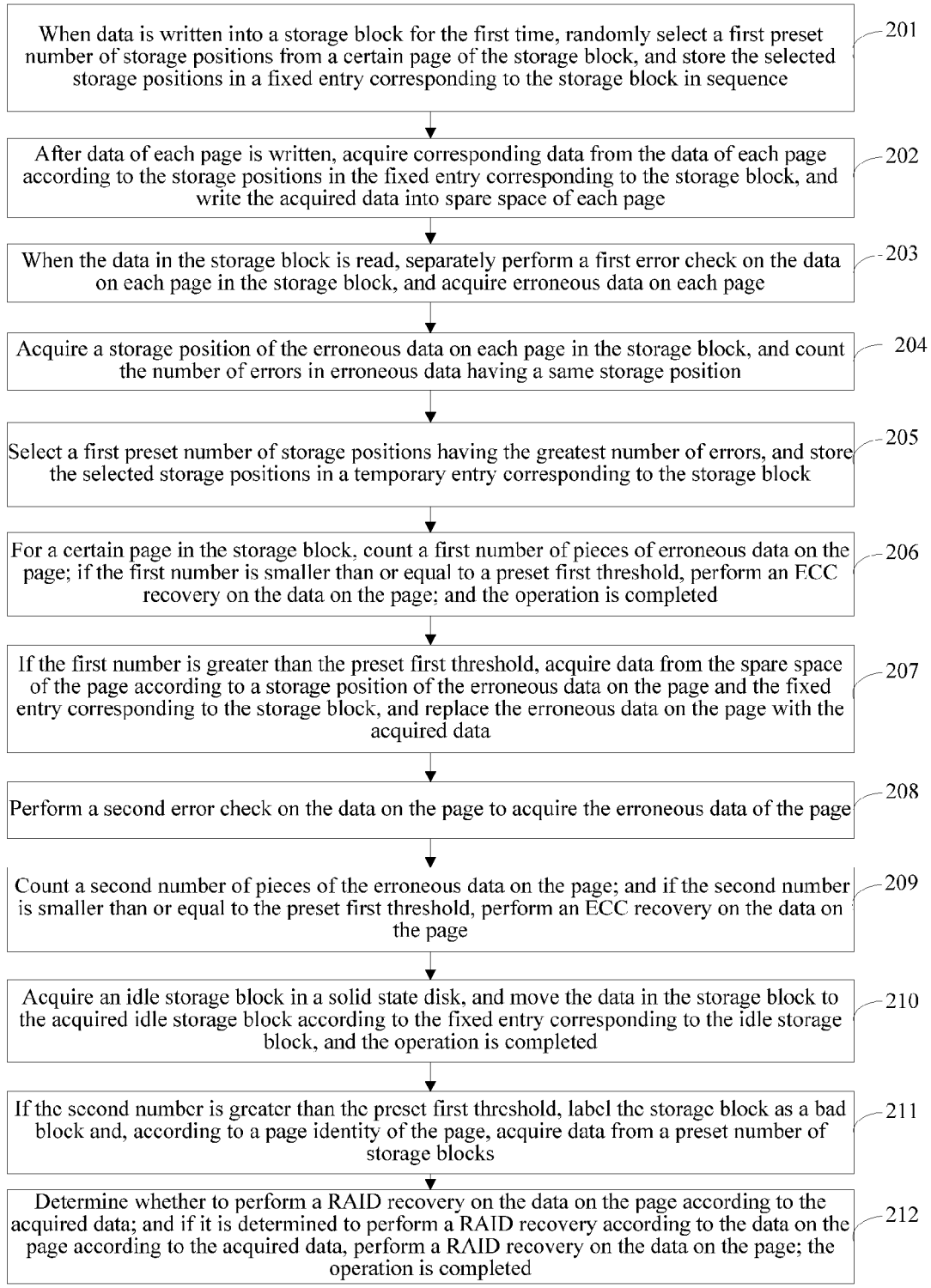
FIG. 2 is a flowchart of another method for recovering erroneous data according to an embodiment of the present invention.

An embodiment of the present invention provides a method for recovering erroneous data. An interior of a Flash chip is divided into a plurality of storage blocks, and each storage block is formed by a plurality of pages. Each page includes primary data space and OOB (e.g., redundant space) space, where the OOB space is used to store ECC data. A size of the ECC data stored in the OOB space is smaller than that of the OOB space; therefore, on each page of the storage block, excluding the primary data space and the space that actually stores the ECC data, certain spare space still exists on each page, where the spare space may store data in a storage position with the highest fault rate. In the embodiment of the present invention, a fixed entry corresponding to the storage block stores a storage position of each data in the spare space of the storage block. When data backup is performed in the spare space of each page in the storage block, data is acquired separately from each page and stored in the spare space corresponding to the page according to the storage position stored in the fixed entry. With reference to FIG. 2, the method includes:

Step 201: When data is written into the storage block for the first time, randomly select a first preset number of storage positions from a certain page of the storage block, and store the selected storage positions in the fixed entry corresponding to the storage block in sequence.

Storage space of each page that is included in the storage block is equivalent. For the entire storage block, a first preset number of storage positions may be randomly selected from a certain page in the storage block; that is, the storage positions corresponding to the data stored in the spare space corresponding to each page in the storage block are the same.

For example, the storage block includes 3 pages, and each page stores 100 bit data; that is, the storage positions of the stored data on each page are storage positions 1-100. It is assumed that the first preset number is 4, and a first storage position selected is the $2^{nd}$ bit, a second storage position is the $45^{th}$ bit, a third storage position is the $70^{th}$ bit, and a fourth storage position is the $90^{th}$ bit. The selected storage positions 2, 45, 70 and 90 are stored in sequence in a fixed entry described in Table 1 below.

TABLE 1

| Storage position | 2, 45, 70, 90 |
| --- | --- |

Step 202: After data of each page is written, acquire corresponding data from the data of each page according to the storage positions in the fixed entry corresponding to the storage block, and write the acquired data into the spare space of each page.

Specifically, after the data of each page is written, the corresponding data is acquired from the data of each page according to the storage positions stored in the fixed entry corresponding to the storage block, and the acquired data is written into the spare space of each page in sequence according to a sequence of the storage positions stored in the fixed entry corresponding to the storage block.

A size of the spare space corresponding to each page is equivalent and is equal to the first preset number; moreover, the storage positions stored in the fixed entry and the data stored in the spare space are in one-to-one correspondence.

For example, from the data of the first page, data in the storage position of the $2^{nd}$ bit, which is 0, is acquired, data in the storage position of the $45^{th}$ bit, which is 1, is acquired, data in the storage position of the $70^{th}$ bit, which is 0, is acquired, and data in the storage position of the $90^{th}$ bit, which is 0, is acquired, then the acquired 4 pieces of data 0100 is stored in spare space of the first page. From the data of the second page, data in the storage position of the $2^{nd}$ bit, which is 0, is acquired, data in the storage position of the $45^{th}$ bit, which is 0, is acquired, data in the storage position of the $70^{th}$ bit, which is 0, is acquired, and data in the storage position of the $90^{th}$ bit, which is 1, is acquired, then the acquired 4 pieces of data 0001 is stored in spare space of the second page. From the data of the third page, data in the storage position of the $2^{nd}$ bit, which is 1, is acquired, data in the storage position of the $45^{th}$ bit, which is 1, is acquired, data in the storage position of the $70^{th}$ bit, which is 0, is acquired, and data in the storage position of the $90^{th}$ bit, which is 0, is acquired, then the acquired 4 pieces of data 1100 is stored in spare space of the third page.

After the data is written into the storage block, a user may read the data from the storage block when the user needs to use the data in the storage block next time.

Step 203: When the data in the storage block is read, separately perform a first error check on the data on each page in the storage block to acquire erroneous data on the page.

Specifically, the data in the storage block is read, and a first error check is performed on the data stored in the primary data space of each page in the storage block to acquire the erroneous data on each page.

Step 204: Acquire a storage position of the erroneous data on each page in the storage block, and count the number of errors in erroneous data in a same storage position.

Specifically, the storage position of the erroneous data on each page in the storage block is acquired, the erroneous data in a same storage position is acquired, and the number of errors in the erroneous data in a same storage position is counted.

For example, storage positions corresponding to the erroneous data on the first page are storage positions 2, 30, 65 and 70, storage positions corresponding to the erroneous data on the second page are storage positions 2, 34, 45 and 78, storage positions corresponding to the erroneous data on the third page are storage positions 2, 65, 70 and 90, and storage positions corresponding to the erroneous data on the fourth page are 10, 45, 65 and 70, then, the number of errors counted in the erroneous data in the storage position of 2 in the storage block is 3, the number of errors counted in the erroneous data in the storage position of 10 in the storage block is 1, the number of errors counted in the erroneous data in the storage position of 30 in the storage block is 1, the number of errors counted in the erroneous data in the storage position of 34 in the storage block is 1, the number of errors counted in the erroneous data in the storage position of 45 in the storage block is 2, the number of errors counted in the erroneous data in the storage position of 65 in the storage block is 3 , the number of errors counted in the erroneous data in the storage position of 70 in the storage block is 3, the number of errors counted in the erroneous data in the storage position of 78 in the storage block is 1, and the number of errors counted in the erroneous data in the storage position of 90 in the storage block is 1.

Step 205: Select a first preset number of storage positions with the greatest number of errors, and store the selected storage positions in a temporary entry corresponding to the storage block.

For example, 4 storage positions with the greatest number of errors, which are 2, 45, 65 and 70 , are selected and the selected storage positions 2, 45, 65 and 70 are stored in sequence in a temporary entry described in Table 2 below.

TABLE 2

| Storage position | 2, 45, 65, 70 |
|---|---|

Step 206: For a certain page in the storage block, count a first number of pieces of erroneous data on the page; if the first number is smaller than or equal to a preset first threshold, perform an ECC recovery on the data on the page; and the operation is completed.

Specifically, for a certain page in the storage block, the first number of pieces of the erroneous data on the page is counted and the first number is compared with the preset first threshold; if the first number is smaller than or equal to the preset first threshold, it is determined that the data on the page can be corrected by using the ECC, and the ECC recovery is performed on the data on the page according to the ECC data stored in the OOB space of the page; and the operation is completed.

When data is written into the storage block, an ECC check is performed on the data stored in the primary data space of each page of the storage block to acquire the ECC data corresponding to each page of the storage block, and store the ECC data corresponding to each page in the OOB space corresponding to the page.

Step 207: If the first number is greater than the preset first threshold, acquire data from the spare space of the page according to a storage position of the erroneous data on the page and the fixed entry corresponding to the storage block, and replace the erroneous data on the page with the acquired data.

Specifically, if the first number is greater than the preset first threshold, it is determined that the data on the page cannot be corrected by using the ECC and, according to the storage positions of the erroneous data on the page, a position sequence, which is in the fixed entry, of the storage positions of the erroneous data is acquired. According to the position sequence, which is in the fixed entry, of the storage positions of the erroneous data, corresponding data is acquired from the spare space and the erroneous data on the page is replaced with the acquired data.

When an SSD is started to use, a probability of occurrence of faults of the data on each page of the storage block, which cannot be corrected by ECC, is relatively small. As time increases, the probability of occurrence of ECC uncorrectable faults of the data on each page may also increase. After a spare space function is enabled, when data is written into each page of the storage block, the fixed entry corresponding to the storage block needs to be searched so as to back up the data in the spare space, which causes certain time delay; therefore, the spare space function may be disabled when the SSD is started to use, and a system is instructed to enable the spare space function only when it is detected that the first number of pieces of the erroneous data is greater than a first preset threshold after a first ECC correction is performed on a certain page.

The first preset threshold is smaller than the preset first threshold. Thus, when the first number of pieces of the erroneous data on a certain page is greater than the first preset threshold and smaller than or equal to the preset first threshold, the spare space function is enabled; when the data in the storage block is read next time, if the first number of pieces of the erroneous data in the storage block is greater than a second preset threshold and smaller than or equal to the preset first threshold, the data in the storage block is moved to a certain idle storage block after the ECC recovery is performed, and the data in the spare space is backed up according to a fixed entry corresponding to the idle storage block.

After the spare space function is enabled, if data is written into a certain idle storage block of the Flash, data having a high fault rate may be directly backed up in the spare space of the storage block according to a fixed entry corresponding to the idle storage block.

The first preset threshold is smaller than the second preset threshold.

Step 208: Perform a second error check on the data on the page to acquire the erroneous data of the page.

Specifically, a second error check is performed on the data stored in the primary data space of the page to acquire the erroneous data on the page.

Step 209: Count a second number of pieces of the erroneous data on the page; and if the second number is smaller than or equal to the preset first threshold, perform an ECC recovery on the data on the page.

Specifically, the second number of pieces of the erroneous data on the page is counted, and the second number is compared with the preset first threshold. If the second number is smaller than or equal to the preset first threshold, it is determined that the data on the page can be corrected by using the ECC, and the ECC recovery is performed on the data on the page according to the ECC data stored in the OOB space of the page.

Step 210: Acquire an idle storage block in the SSD, and move the data in the storage block to the idle storage block according to a fixed entry corresponding to the idle storage block; and the operation is completed.

Specifically, the idle storage block in the SSD is acquired. The data stored in the primary data space of the storage block and the ECC data stored in the OOB space of the storage block are moved to the acquired idle storage block. According to a storage position in the fixed entry corresponding to the idle storage block, data corresponding to the storage position is acquired from the data moved to each page of the idle storage block, and stored in spare space of each page in the idle storage block; and the operation is completed.

Further, the fixed entry corresponding to the storage block is replaced with in the temporary entry corresponding to the storage block. When data is written into the storage block next time, data backup is performed in the spare space of each page in the storage block according to the storage positions stored in the replaced fixed entry.

When data on a certain page cannot be corrected by using a first ECC, after erroneous data is replaced with data stored in spare space, data on the page can be corrected by using a second ECC, and after the ECC recovery is performed on the data on the page, the system should be instructed to move the recovered data of the storage block to another idle storage block in idle time, so as to prevent more erroneous data in the storage block and cause that the data cannot be corrected by using a second ECC either. Meanwhile, after the data in the storage block is moved, a probability that the moved data cannot be corrected by using a first ECC is particularly small; therefore, only one ECC is required for reading the moved data, which may greatly increase efficiency.

Step 211: If the second number is greater than the preset first threshold, label the storage block as a bad block and, according to the page identity of the page, acquire data from a preset number of storage blocks.

Specifically, if the second number is greater than the preset first threshold, the storage block is labeled as a bad block and, according to the page identity of the page, a page having a same page identity as that of the page is acquired from the preset number of storage blocks, and data is read from the acquired page.

Step 212: Determine whether to perform a RAID recovery on the data on the page according to the acquired data; if it is determined to perform a RAID recovery on the data on the page according to the acquired data, perform a RAID recovery on the data on the page; and the operation is completed.

Specifically, an error check is performed on the acquired data and an error check is performed on the data on the page that has a same page identity as that of the page and is in a RAID redundant storage block. If the data on the page that corresponds to the page identity and is in the RAID redundant storage block can be corrected by using the ECC, the number of pieces of data that cannot be corrected by using the ECC is counted, where the data is on a page that corresponds to the page identity and is in the preset number of storage blocks. If the number of the data that cannot be corrected by using the ECC is smaller than or equal to a preset second threshold, it is determined that a RAID recovery can be performed on the data on the page. A RAID recovery is performed on the data on the page in the storage block according to the data on the page in the RAID redundant storage block; and the operation is completed.

A RAID check is performed in advance on the data on the page that has a same page identity and is in the preset number of storage blocks, and a check result is stored on the page that corresponds to the page identity and is in the RAID redundant storage block corresponding to the preset number of storage blocks.

Further, if the number of pieces of data that cannot be corrected by using the ECC is greater than the preset second threshold, it is determined that a RAID recovery cannot be performed on the data on the page. Reading of the data on the page is wrong, and the operation is completed.

For example, the second number of pieces of the erroneous data on the second page in the storage block is 20, and the preset first threshold is 5; because the second number is greater than the preset first threshold, the storage block is labeled as a bad block. It is assumed that the preset number is 16, and the preset second threshold is 3, then data on the second page in 16 storage blocks is acquired, an error check is performed on the acquired data on the second page of each storage block, and an error check is performed on the data on the second page in the RAID redundant storage block. If the data on the second page in the RAID redundant storage block can be corrected by using the ECC, and the number of pieces of data that is on the second page in the 16 storage blocks and cannot be corrected by using the ECC is 2, which is smaller than the preset second threshold 3, it is determined that a RAID recovery can be performed on the data on the page. A RAID recovery is performed on the data on the second page in the storage block according to the data on the second page in the RAID redundant storage block, and correct data is returned.

In the embodiment of the present invention, when data is written into the storage block, according to a fixed entry corresponding to the storage block, corresponding data is acquired from each page of the storage block and written into spare space of each page. When the data in the storage block is read, a first error check is performed on data on a certain page in the storage block. When the data on the page cannot be corrected by using the a first ECC, erroneous data is replaced with the data stored in the spare space of the page, and a second error check is performed on the data on the page. When the data on the page cannot be corrected by using the ECC again, a RAID recovery is performed. Data having a high error probability is stored in the spare space of OOB space of each page, which not only makes full use of the OOB space, but also replaces the erroneous data according to the data stored in the spare space of each page. In addition, a second error check is performed, which may greatly decrease a probability of occurrence of uncorrectable faults, so as to avoid simply labeling the storage block as a bad block.

Figure 3:
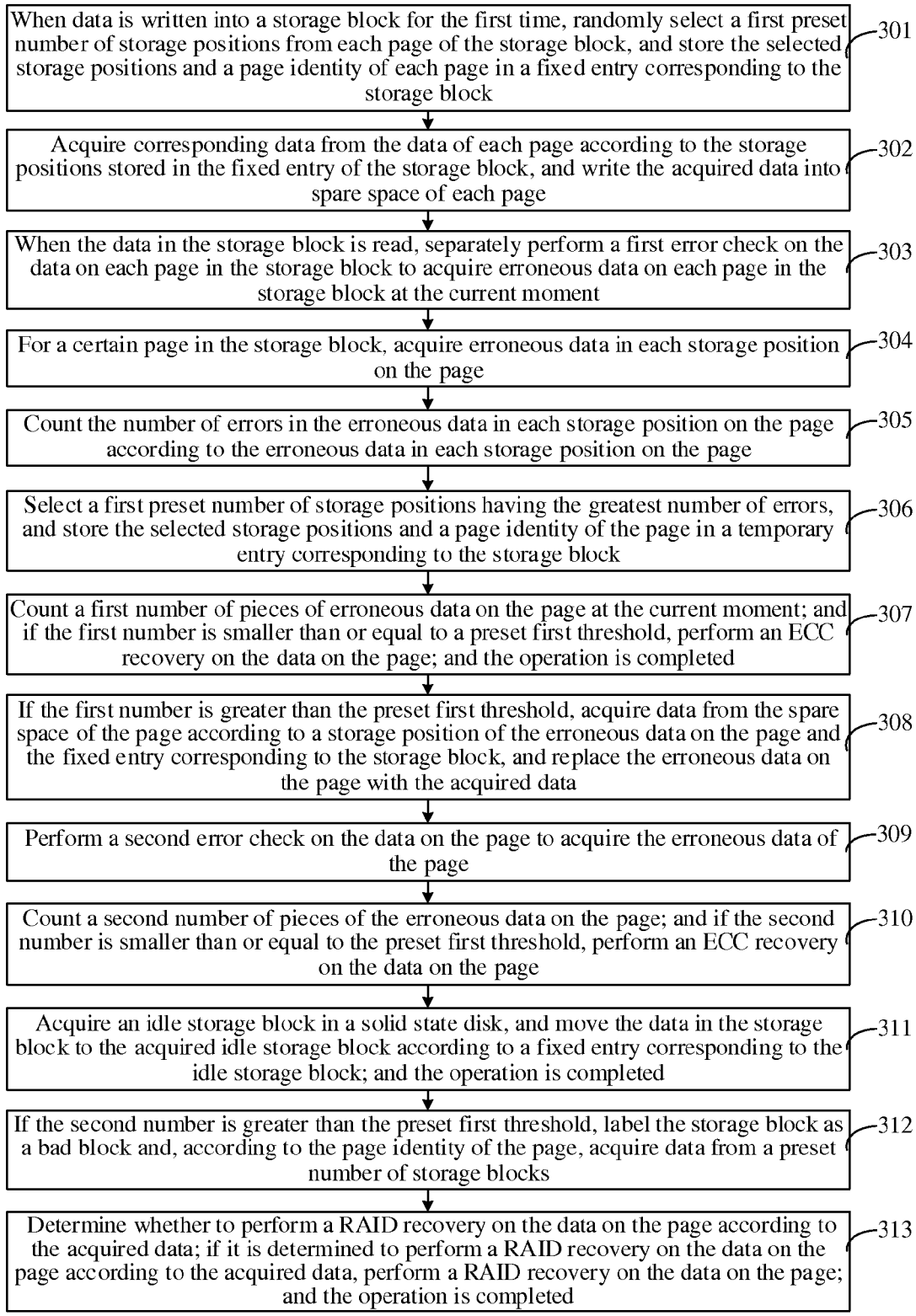
FIG. 3 is a flowchart of another method for recovering erroneous data according to an embodiment of the present invention.

An embodiment of the present invention provides a method for recovering erroneous data. An interior of a Flash chip is divided into a plurality of storage blocks, and each storage block is formed by a plurality of pages. Each page includes primary data space and OOB space, where the OOB space is used to store ECC data. A size of the ECC data stored in the OOB space is smaller than that of the OOB space; therefore, on each page of the storage block, excluding the primary data space and the space that actually stores the ECC data, certain spare space still exists on each page, where the spare space may store data in a storage position with the highest fault rate. In the embodiment of the present invention, a fixed entry corresponding to the storage block stores correspondence between a storage position and a page identity. The number of storage positions corresponding to each page identity is equal to a size of the spare space of each page; moreover, the storage position corresponding to the page identity is the storage position with the greatest number of errors in erroneous data on the page. When data backup is performed in the spare space of each page in the storage block, a corresponding storage position is acquired from the fixed entry according to the page identity of the page, and corresponding data is acquired from the data on the page according to the acquired storage position and is stored in the spare space of the page. With reference to FIG. 3, the method includes:

Step 301: When data is written into the storage block for the first time, randomly select a first preset number of storage positions from each page of the storage block, and store the selected storage positions and a page identity of each page in a fixed entry corresponding to the storage block.

A fixed entry stores the correspondence between the page identity and the storage position.

The storage positions corresponding to each page identity in the fixed entry may be the same, and may also be different.

For example, the storage block includes 3 pages, and each page stores 100 bit data; that is, the storage positions of the stored data on each page are storage positions 1-100. It is assumed that the first preset number is 4; selected from the first page, a first storage position is the $2^{nd}$ bit, a second storage position is the $45^{th}$ bit, a third storage position is the $70^{th}$ bit, and a fourth storage position is the $90^{th}$ bit; selected from the second page, a first storage position is the $2^{nd}$ bit, a second storage position is the $50^{th}$ bit, a third storage position is the $56^{th}$ bit, and a fourth storage position is the $80^{th}$ bit; and selected from the third page, a first storage position is the $5^{th}$ bit, a second storage position is the $45^{th}$ bit, a third storage position is the $80^{th}$ bit, and a fourth storage position is the $90^{th}$ bit. The storage positions 2, 45, 70 and 90 on the first page as well as a page identity Name1 of the first page are stored in a fixed entry described in Table 3 below. The storage positions 2, 50, 56 and 80 on the second page as well as a page identity Name2 of the second page are stored in a fixed entry described in Table 3 below. The storage positions 5, 45, 80 and 90 on the third page as well as a page identity Name3 of the third page are stored in a fixed entry described in Table 3 below.

TABLE 3

| Page identity | Storage position |
| --- | --- |
| Name1 | 2, 45, 70, 90 |
| Name2 | 2, 50, 56, 80 |
| Name3 | 5, 45, 80, 90 |

Step 302: After data of each page is written, acquire corresponding data from the data of each page according to the storage positions in the fixed entry corresponding to the storage block, and write the acquired data into the spare space of each page.

Specifically, after the data of each page is written, the corresponding data is acquired from the data of each page according to the storage positions stored in the fixed entry corresponding to the storage block, and the acquired data is written into the spare space of each page in sequence according to a sequence of the storage positions stored in the fixed entry corresponding to the storage block.

A size of the spare space corresponding to each page is equivalent and is equal to the first preset number; moreover, the storage positions stored in the fixed entry and the data stored in the spare space are in one-to-one correspondence.

For example, from the data of the first page, data in the storage position of the $2^{nd}$ bit, which is 0, is acquired, data in the storage position of the $45^{th}$ bit, which is 1, is acquired, data in the storage position of the $70^{th}$ bit, which is 0, is acquired, and data in the storage position of the $90^{th}$ bit, which is 0, is acquired, then the acquired 4 pieces of data 0100 is stored in spare space of the first page. From the data of the second page, data in the storage position of the $2^{nd}$ bit, which is 0, is acquired, data in the storage position of the $50^{th}$ bit, which is 0, is acquired, data in the storage position of the $56^{th}$ bit, which is 0, is acquired, and data in the storage position of the $80^{th}$ bit, which is 1, is acquired, then the acquired 4 pieces of data 0001 is stored in spare space of the second page. From the data of the third page, data in the storage position of the $5^{th}$ bit, which is 1, is acquired, data in the storage position of the $45^{th}$ bit, which is 1, is acquired, data in the storage position of the $80^{th}$ bit, which is 0, is acquired, and data in the storage position of the $90^{th}$ bit, which is 0, is acquired, then the acquired 4 pieces of data 1100 is stored in spare space of the third page.

After the data is written into the storage block, a user may read the data from the storage block when the user needs to use the data in the storage block next time.

Step 303: When the data in the storage block is read, separately perform a first error check on the data on each page in the storage block to acquire erroneous data on each page in the storage block at the current moment.

Specifically, the data in the storage block is read, and a first error check is separately performed on the data stored in the primary data space of each page in the storage block to acquire the erroneous data on each page in the storage block at the current moment.

Step 304: For a certain page in the storage block, acquire erroneous data in each storage position on the page.

The erroneous data in each storage position on other pages in the storage block may be acquired according to the foregoing step 304.

Step 305: Count the number of errors in the erroneous data in each storage position on the page according to the erroneous data in each storage position on the page.

The number of errors in the erroneous data in each storage position on other pages in the storage block may be counted according to the foregoing step 305.

For example, on the first page, the erroneous data in the storage position of the $2^{nd}$ bit is 0, 1, 1 and 0, the erroneous data in the storage position of the $30^{th}$ bit is 1, 1, 0, 1 and 0, the erroneous data in the storage position of the $45^{th}$ bit is 1, 1 and 0, the erroneous data in the storage position of the $70^{th}$ bit is 1, 1, 0, 1 and 0, the erroneous data in the storage position of the $75^{th}$ bit is 1, 0, 1 and 0, the erroneous data in the storage position of the $90^{th}$ bit is 0, 1 and 0, and there is no erroneous data in other storage positions, then, on the first page, the number of errors in the erroneous data in the storage position of the $2^{nd}$ bit is 4, the number of errors in the erroneous data in the storage position of the $30^{th}$ bit is 5, the number of errors in the erroneous data in the storage position of the $45^{th}$ bit is 3, the number of errors in the erroneous data in the storage position of the $70^{th}$ bit is 5, the number of errors in the erroneous data in the storage position of the $75^{th}$ bit is 4, and the number of errors in the erroneous data in the storage position of the $90^{th}$ bit is 3.

On the first page, the erroneous data in the storage position of the $2^{nd}$ bit is 1, 1, 1 and 0, the erroneous data in the storage position of the $45^{th}$ bit is 1, 1, 0, 1 and 0, the erroneous data in the storage position of the $50^{th}$ bit is 1, 1 and 0, the erroneous data in the storage position of the $56^{th}$ bit is 1, 1, 0, 1 and 0, the erroneous data in the storage position of the $75^{th}$ bit is 1, 0, 1 and 0, the erroneous data in the storage position of the 80$^{th}$ bit is 0, 1 and 0, and there is no erroneous data in other storage positions, then, on the first page, the number of errors in the erroneous data in the storage position of the 2$^{nd}$ bit is 4, the number of errors in the erroneous data in the storage position of the 45$^{th}$ bit is 5, the number of errors in the erroneous data in the storage position in the 50$^{th}$ bit is 3, the number of errors in the erroneous data in the storage position of the 56$^{th}$ bit is 5, the number of errors in the erroneous data in the storage position of the 75$^{th}$ bit is 4, and the number of errors in the erroneous data in the storage position of the 80$^{th}$ bit is 3.

On the first page, the erroneous data in the storage position of the 5$^{th}$ bit is 0, 1, 1 and 0, the erroneous data in the storage position of the 30$^{th}$ bit is 1, 1, 0, 1 and 0, the erroneous data in the storage position of the 45$^{th}$ bit is 1, 1 and 0, the erroneous data in the storage position of the 70$^{th}$ bit is 1, 1, 0, 1 and 0, the erroneous data in the storage position of the 85$^{th}$ bit is 1, 0, 1 and 0, the erroneous data in the storage position of the 90$^{th}$ bit is 0, 1 and 0, and there is no erroneous data in other storage positions, then, on the first page, the number of errors in the erroneous data in the storage position of the 5$^{th}$ bit is 4, the number of errors in the erroneous data in the storage position of the 30$^{th}$ bit is 5, the number of errors in the erroneous data in the storage position of the 45$^{th}$ bit is 3, the number of errors in the erroneous data in the storage position of the 70$^{th}$ bit is 5, the number of errors in the erroneous data in the 85$^{th}$ bit is 4, and the number of errors in the erroneous data in the storage position of the 90$^{th}$ bit is 3.

Step 306: Select a first preset number of storage positions with the greatest number of errors, and store the selected storage positions and the page identity of the page in a temporary entry corresponding to the storage block.

The temporary entry stores a correspondence between the page identity and a position number.

For example, 4 storage positions with the greatest number of errors, which are 2, 30, 70 and 75, are selected from the first page; 4 storage positions with the greatest number of errors, which are 2, 45, 56 and 75, are selected from the second page; and 4 storage positions with the greatest number of errors, which are 5, 30, 70 and 85, are selected from the third page. A page identity Name1 of the first page and the selected storage positions 2, 30, 70 and 75 are stored in a temporary entry described in Table 4 below; a page identity Name2 of the second page and the selected storage positions 2, 45, 56 and 75 are stored in a temporary entry described in Table 4 below; and a page identity Name3 of the third page and the selected storage positions 5, 30, 70 and 85 are in a temporary entry described in Table 4 below.

TABLE 4

| Page identity | Storage position |
|---|---|
| Name1 | 2, 30, 70, 75 |
| Name2 | 2, 45, 56, 75 |
| Name3 | 5, 30, 70, 85 |

Step 307: Count a first number of pieces of erroneous data on the page at the current moment; if the first number is smaller than or equal to a preset first threshold, perform an ECC recovery on the data on the page; and the operation is completed.

Specifically, the first number of pieces of the erroneous data on each page is counted and the first number is compared with the preset first threshold; if the first number is smaller than or equal to the preset first threshold, it is determined that the data on the page can be corrected by using the ECC, and the ECC recovery is performed on the data on the page according to the ECC data stored in the OOB space of the page; and the operation is completed.

When data is written into the storage block, an ECC check is performed on the data stored in the primary data space of each page of the storage block to acquire the ECC data corresponding to each page of the storage block, and store the ECC data corresponding to each page in the OOB space corresponding to the page.

Step 308: If the first number is greater than the preset first threshold, acquire data from the spare space of the page according to a storage position of the erroneous data on the page and the fixed entry corresponding to the storage block, and replace the erroneous data on the page with the acquired data.

Specifically, if the first number is greater than the preset first threshold, it is determined that the data on the page cannot be corrected by using the ECC and, according to the storage positions of the erroneous data on the page and the page identity of the page, a position sequence, which is in the fixed entry, of the storage positions of the erroneous data is acquired. According to the position sequence, which is in the fixed entry, of the storage positions of the erroneous data, corresponding data is acquired from the spare space of the page and the erroneous data on the page is replaced with the acquired data.

A specific operation for acquiring the position sequence of the storage positions of the erroneous data in the fixed entry according to the storage positions of the erroneous data on the page and the page identity of the page includes acquiring corresponding storage positions from the fixed entry corresponding to the storage block according to the page identity of the page, and determining a position sequence of the storage positions of the erroneous data on the page in the fixed entry from the acquired storage positions according to the storage positions of the erroneous data on the page.

When an SSD is started to use, a probability of occurrence of ECC uncorrectable faults of the data on each page of the storage block is relatively small. As time increases, the probability of occurrence of ECC uncorrectable faults of the data on each page may also increase. After a spare space function is enabled, when data is written into each page of the storage block, the fixed entry corresponding to the storage block needs to be searched so as to back up the data in the spare space, which causes certain time delay; therefore, the spare space function may be disabled when the SSD is started to use, and a system is instructed to enable the spare space function only when it is detected that the first number of pieces of the erroneous data is greater than a first preset threshold after a first ECC correction is performed on a certain page.

The first preset threshold is smaller than the preset first threshold. Thus, when the first number of pieces of the erroneous data on a certain page is greater than the first preset threshold and smaller than or equal to the preset first threshold, the spare space function is enabled; when the data in the storage block is read next time, if the first number of pieces of the erroneous data in the storage block is greater than a second preset threshold and smaller than or equal to the preset first threshold, the data in the storage block is moved to a certain idle storage block after the ECC recovery is performed, and the data in the spare space is backed up according to a fixed entry corresponding to the idle storage block.

After the spare space function is enabled, if data is written into a certain idle storage block of the Flash, data having a high fault rate may be directly backed up in the spare space of the storage block according to a fixed entry corresponding to the idle storage block.

The first preset threshold is smaller than the second preset threshold.

Step 309: Perform a second error check on the data on the page to acquire the erroneous data of the page.

Specifically, a second error check is performed on the data stored in the primary data space and the ECC data of the page to acquire the erroneous data on the page.

Step 310: Count a second number of pieces of the erroneous data on the page; and if the second number is smaller than or equal to the preset first threshold, perform an ECC recovery on the data on the page.

Specifically, the second number of pieces of the erroneous data on the page is counted, and the second number is compared with the preset first threshold. If the second number is smaller than or equal to the preset first threshold, it is determined that the data on the page can be corrected by using the ECC, and the ECC recovery is performed on the data on the page according to the ECC data stored in the OOB space of the page.

Step 311: Acquire an idle storage block in the SSD, and move the data in the storage block to the idle storage block according to a fixed entry corresponding to the idle storage block; and the operation is completed.

Specifically, the idle storage block in the SSD is acquired. The data stored in the primary data space of the storage block and the ECC data stored in the OOB space of the storage block are moved to the acquired idle storage block. According to a storage position in the fixed entry corresponding to the idle storage block, data corresponding to the storage position is acquired from the data moved to each page of the idle storage block, and stored in spare space of each page in the idle storage block; and the operation is completed.

Further, the fixed entry corresponding to the storage block is replaced with in the temporary entry corresponding to the storage block. When data is written into the storage block next time, data backup is performed in the spare space of each page in the storage block according to the storage positions stored in the replaced fixed entry.

When data on a certain page cannot be corrected by using a first ECC, after erroneous data is replaced with data stored in spare space, data on the page can be corrected by using a second ECC, and after the ECC recovery is performed on the data on the page, the system should be instructed to move the recovered data of the storage block to another idle storage block in idle time, so as to prevent more erroneous data in the storage block and cause that the data cannot be corrected by using a second ECC either. Meanwhile, after the data in the storage block is moved, a probability that the moved data cannot be corrected by using a first ECC is particularly small; therefore, only one ECC is required for reading the moved data, which may greatly increase efficiency.

Step 312: If the second number is greater than the preset first threshold, label the storage block as a bad block, and according to the page identity of the page, acquire data from a preset number of storage blocks.

Specifically, if the second number is greater than the preset first threshold, the storage block is labeled as a bad block and, according to the page identity of the page, a page having a same page identity as that of the page is acquired from the preset number of storage blocks, and data is read from the acquired page.

Step 313: Determine whether to perform a RAID recovery on the data on the page according to the acquired data; if it is determined to perform a RAID recovery on the data on the page according to the acquired data, perform a RAID recovery on the data on the page; and the operation is completed.

Specifically, an error check is performed on the acquired data and an error check is performed on the data on the page that has a same page identity as that of the page and is in a RAID redundant storage block. If the data on the page that corresponds to the page identity and is in the RAID redundant storage block can be corrected by using the ECC, the number of pieces of data that cannot be corrected by using the ECC is counted, where the data is on a page that corresponds to the page identity and is in the preset number of storage blocks. If the number of the data that cannot be corrected by using the ECC is smaller than or equal to a preset second threshold, it is determined that a RAID recovery can be performed on the data on the page. A RAID recovery is performed on the data on the page in the storage block according to the data on the page in the RAID redundant storage block; and the operation is completed.

A RAID check is performed in advance on the data on the page that has a same page identity and is in the preset number of storage blocks, and a check result is stored on the page that corresponds to the page identity and is in the RAID redundant storage block corresponding to the preset number of storage blocks.

Further, if the number of pieces of data that cannot be corrected by using the ECC is greater than the preset second threshold, it is determined that a RAID recovery cannot be performed on the data on the page. Reading of the data on the page is wrong, and the operation is completed.

For example, the second number of pieces of the erroneous data on the second page in the storage block is 20, and the preset first threshold is 5; because the second number is greater than the preset first threshold, the storage block is labeled as a bad block. It is assumed that the preset number is 16, and the preset second threshold is 3, then data on the second page in 16 storage blocks is acquired, an error check is performed on the acquired data on the second page of each storage block, and an error check is performed on the data on the second page in the RAID redundant storage block. If the data on the second page in the RAID redundant storage block can be corrected by using the ECC, and the number of pieces of data that is on the second page in the 16 storage blocks and cannot be corrected by using the ECC is 2, which is smaller than the preset second threshold 3, it is determined that a RAID recovery can be performed on the data on the page. A RAID recovery is performed on the data on the second page in the storage block according to the data on the second page in the RAID redundant storage block, and correct data is returned.

In the embodiment of the present invention, a fixed entry corresponding to the storage block stores a first preset number of storage positions with the greatest number of errors in erroneous data stored in each position of each page. When data in the storage block is read, a first error check is performed on data on a certain page in the storage block. When the data on the page cannot be corrected by using a first ECC, the erroneous data is replaced with data stored in spare space of the page, and a second error check is performed on the data on the page. When the data on the page cannot be corrected by using the ECC again, a RAID recovery is performed. The storage positions stored in the fixed entry are acquired according to the number of historical errors in the data corresponding to each storage position, which improves validity of the data stored in the spare space. Moreover, data having a high error probability is stored in the spare space of OOB space of each page, which not only makes full use of the OOB space, but also replaces the erroneous data according to the data stored in the spare space of each page. In addition, a second error check is performed, which may greatly decrease a probability of occurrence of uncorrectable faults, so as to avoid simply labeling the storage block as a bad block.

Figure 4:
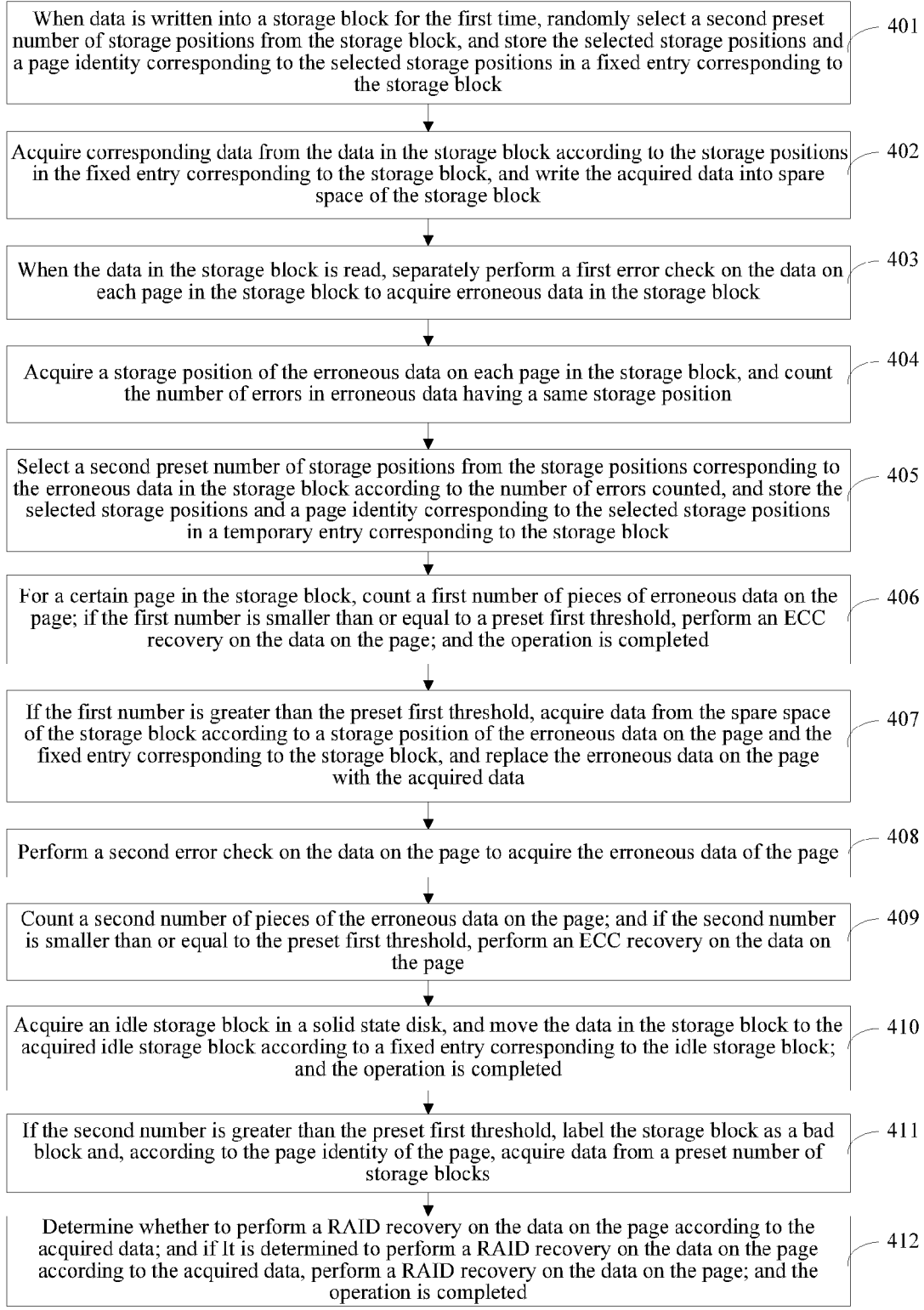
FIG. 4 is a flowchart of another method for recovering erroneous data according to an embodiment of the present invention.

An embodiment of the present invention provides a method for recovering erroneous data. An interior of a Flash chip is divided into a plurality of storage blocks, and each storage block is formed by a plurality of pages. Each page includes primary data space and OOB space, where the OOB space is used to store ECC data. A size of the ECC data stored in the OOB space is smaller than that of the OOB space; therefore, on each page of the storage block, excluding the primary data space and the space that actually stores the ECC data, certain spare space still exists on each page, where the spare space may store data in a storage position with the highest fault rate. In the embodiment of the present invention, a fixed entry corresponding to the storage block stores correspondence between a storage position and a page identity. The number of storage positions corresponding to each page identity is not necessarily equal, and the number of all the storage positions stored in the fixed entry is equal to a size of all the spare space of the storage block. When data backup is performed in the spare space of each page in the storage block, a corresponding storage position is acquired from the fixed entry according to the page identity of the page, and corresponding data is acquired from the data on the page according to the acquired storage position and is stored in the spare space of the storage block. With reference to FIG. 4, the method includes:

Step 401: When data is written into the storage block for the first time, randomly select a second preset number of storage positions from the storage block, and store the selected storage positions and a page identity corresponding to the selected storage positions in a fixed entry corresponding to the storage block.

A fixed entry stores the correspondence between the page identity and a position number.

For a storage block, erroneous data does not necessarily appear on each page in the storage block. When no erroneous data appears on a certain page, spare space corresponding to the page may possibly be wasted; therefore, a second preset number of storage positions are selected from the storage block according the embodiment of the present invention, which does not result in a waste of spare space of a certain page.

For example, the storage block includes 3 pages, and each page stores 100 bit data; that is, the storage positions of the stored data on each page are storage positions 1-100. It is assumed that the first preset number is 4; when data is written into the storage block for the first time, from the first page of the storage block, 2 storage positions are randomly selected, which are the $2^{nd}$ bit and the $45^{th}$ bit respectively; from the second page of the storage block, 6 storage positions are randomly selected, which are the $2^{nd}$ bit, the $5^{th}$ bit, the $34^{th}$ bit, the $56^{th}$ bit, the $80^{th}$ bit and the $90^{th}$ bit respectively; and from the third page of the storage block, 4 storage positions are randomly selected, which are the $2^{nd}$ bit, the $34^{th}$ bit, the $60^{th}$ bit and the $90^{th}$ bit respectively. A page identity Name1 of the first page and the positions 2 and 45 selected from the first page are stored in a fixed entry described in Table 5 below. A page identity Name3 of the second page and the positions 2, 5, 34, 56, 80 and 90 selected from the second page are stored in a fixed entry described in Table 5 below. A page identity Name3 of the third page and the positions 2, 34, 60 and 90 selected from the third page are stored in a fixed entry described in Table 5 below.

TABLE 5

| Page identity | Storage position |
| --- | --- |
| Name1 | 2, 45 |
| Name2 | 2, 5, 34, 56, 80, 90 |
| Name3 | 2, 34, 60, 90 |

Step 402: After data of each page is written, acquire corresponding data from the data in the storage block according to the storage positions in the fixed entry corresponding to the storage block, and write the acquired data into the spare space of the storage block.

Specifically, after the data of each page is written, the corresponding data is acquired from the data in the storage block according to the storage positions stored in the fixed entry corresponding to the storage block, and the acquired data is written into the spare space of the storage block in sequence according to a sequence of the storage positions stored in the fixed entry corresponding to the storage block.

The second preset number is the sum of a size of the spare space of each page in the storage block; moreover, the storage positions stored in the fixed entry and the data stored in the spare space are in one-to-one correspondence.

For example, from the first page, data in the storage position of the $2^{nd}$ bit, which is 0, is acquired, and data in the storage position of the $45^{th}$ bit, which is 1, is acquired; from the second page, data in the storage position of the $2^{nd}$ bit, which is 1, is acquired, data in the storage position of the $5^{th}$ bit, which is 1, is acquired, data in the storage position of the $34^{th}$ bit, which is 0, is acquired, data in the storage position of the $56^{th}$ bit, which is 1, is acquired, data in the storage position of the $80^{th}$ bit, which is 0, is acquired, and data in the storage position of the $90^{th}$ bit, which is 1, is acquired; from the third page, data in the storage position of the $2^{nd}$ bit, which is 0, is acquired, data in the storage position of the $34^{th}$ bit, which is 1, is acquired, data in the storage position of the $60^{th}$ bit, which is 0, is acquired, and data in the storage position of the $90^{th}$ bit, which is 1, is acquired. The 2 pieces of data 01 acquired from the first page and the former 2 pieces of data 11 acquired from the second page are stored in spare space of the first page; the latter 4 pieces of data 0101 are stored in spare space of the second page; and the 4 pieces of data 0101 acquired from the third page are stored in spare space of the third page.

After the data is written into the storage block, a user may read the data from the storage block when the user needs to use the data in the storage block next time.

Step 403: When the data in the storage block is read, separately perform a first error check on the data on each page in the storage block, to acquire erroneous data in the storage block.

Specifically, the data in the storage block is read, and a first error check is separately performed on the data stored in the primary data space of each page in the storage block to acquire the erroneous data in the storage block.

Step 404: Acquire a storage position of the erroneous data on each page in the storage block, and count the number of errors in erroneous data in a same storage position.

Specifically, the storage position of the erroneous data on each page in the storage block is acquired, the erroneous data in a same storage position is acquired, and the number of errors in the erroneous data in a same storage position is counted.

For example, storage positions of the erroneous data on the first page are storage positions 2, 5, 30, 45 and 60 respectively, storage positions of the erroneous data on the second page are storage positions 2, 5, 30, 45, 60, 80 and 90 respectively, and storage positions of the erroneous data on the third page are storage positions 2, 5, 34 and 56 respectively; then, the number of errors counted in the erroneous data in the storage position of 2 is 3, the number of errors counted in the erroneous data in the storage position of 5 is 3, the number of errors counted in the erroneous data in the storage position of 30 is 2, the number of errors counted in the erroneous data in the storage position of 34 is 1, the number of errors counted in the erroneous data in the storage position of 45 is 2, the number of errors counted in the erroneous data in the storage position of 56 is 1, the number of errors counted in the erroneous data in the storage position of 60 is 2, the number of errors counted in the erroneous data in the storage position of 80 is 1, and the number of errors counted in the erroneous data in the storage position of 90 is 1.

Step 405: Select a second preset number of storage positions from the storage positions corresponding to the erroneous data in the storage block according to the number of errors counted, and store the selected storage positions and a page identity corresponding to the selected storage positions in a temporary entry corresponding to the storage block.

Specifically, the storage positions corresponding to the erroneous data in the storage block is sorted according to the number of errors counted, a sequence of the storage positions corresponding to the erroneous data in the storage block is required, and a second preset number of storage positions are selected according to the sequence of the storage positions corresponding to the erroneous data in the storage block.

The storage positions corresponding to the erroneous data in the storage block may be sorted according to the number of errors from greatest to smallest.

For example, the storage positions corresponding to the erroneous data in the storage block are sorted according to the number of errors counted, and the sequence of storage positions corresponding to the erroneous data in the storage block is acquired, which is 2, 5, 30, 45, 60, 34, 80 and 90. 12 storage positions that are sorted higher are selected, which are the $2^{nd}$ bit on the first page, the $2^{nd}$ bit on the second page, the $2^{nd}$ bit on the third page, the $5^{th}$ bit on the first page, the $5^{th}$ bit on the second page, the $5^{th}$ bit on the third page, the $30^{th}$ bit on the first page, the $30^{th}$ bit on the second page, the $45^{th}$ bit on the first page, the $45^{th}$ bit on the second page, the $60^{th}$ bit on the first page and the $60^{th}$ bit on the second page. A page identity Name1 of the first page and the storage positions 2, 5, 30, 45 and 60 on the first page are stored in a temporary entry described in Table 6 below. A page identity Name2 of the second page and the storage positions 2, 5, 30, 45 and 60 on the third page in a temporary entry described in Table 6 below. A page identity Name3 of the third page and the storage positions 2 and 5 on the third page are stored in a temporary entry described in Table 6 below.

TABLE 6

| Page identity | Storage position |
|---|---|
| Name1 | 2, 5, 30, 45, 60 |
| Name2 | 2, 5, 30, 45, 60 |
| Name3 | 2, 5 |

Step 406: For a certain page in the storage block, count a first number of pieces of erroneous data on the page; if the first number is smaller than or equal to a preset first threshold, perform an ECC recovery on the data on the page; and the operations is completed.

Specifically, for a certain page in the storage block, the first number of pieces of the erroneous data on the page is counted and the first number is compared with the preset first threshold; if the first number is smaller than or equal to the preset first threshold, it is determined that the data on the page can be corrected by using the ECC, and the ECC recovery is performed on the data on the page according to the ECC data stored in the OOB space of the page; and the operation is completed.

When data is written into the storage block, an ECC check is performed on the data stored in the primary data space of each page of the storage block to acquire the ECC data corresponding to each page of the storage block, and store the ECC data corresponding to each page in the OOB space corresponding to the data.

Step 407: If the first number is greater than the preset first threshold, acquire data from the spare space of the storage block according to a storage position of the erroneous data on the page and the fixed entry corresponding to the storage block, and replace the erroneous data on the page with the acquired data.

Specifically, if the first number is greater than the preset first threshold, it is determined that the data on the page cannot be corrected by using the ECC and, according to the storage positions of the erroneous data on the page, a position sequence, which is in the fixed entry, of the storage positions of the erroneous data is acquired. According to the position sequence, which is in the fixed entry, of the storage positions of the erroneous data, corresponding data is acquired from the spare space of the storage block and the erroneous data on the page is replaced with the acquired data.

When an SSD is started to use, a probability of occurrence of ECC uncorrectable faults of the data on each page of the storage block is relatively small. As time increases, the probability of occurrence of ECC uncorrectable faults of the data on each page may also increase. After a spare space function is enabled, when data is written into each page of the storage block, the fixed entry corresponding to the storage block needs to be searched so as to back up the data in the spare space, which causes certain time delay; therefore, the spare space function may be disabled when the SSD is started to use, and a system is instructed to enable the spare space function only when it is detected that the first number of pieces of the erroneous data is greater than a first preset threshold after a first ECC correction is performed on a certain page.

The first preset threshold is smaller than the preset first threshold. Thus, when the first number of pieces of the erroneous data on a certain page is greater than the first preset threshold and smaller than or equal to the preset first threshold, the spare space function is enabled; when the data in the storage block is read next time, if the first number of pieces of the erroneous data in the storage block is greater than a second preset threshold and smaller than or equal to the preset first threshold, the data in the storage block is moved to a certain idle storage block after the ECC recovery is performed, and the data in the spare space is backed up according to a fixed entry corresponding to the idle storage block.

After the spare space function is enabled, if data is written into a certain idle storage block of the Flash, data having a high fault rate may be directly backed up in the spare space of the storage block according to a fixed entry corresponding to the idle storage block.

The first preset threshold is smaller than the second preset threshold.

Step 408: Perform a second error check on the data on the page to acquire the erroneous data of the page.

Specifically, a second error check is performed on the data stored in the primary data space of the page to acquire the erroneous data on the page.

Step 409: Count a second number of pieces of the erroneous data on the page; and if the second number is smaller than or equal to the preset first threshold, perform an ECC recovery on the data on the page.

Specifically, the second number of pieces of the erroneous data on the page is counted, and the second number is compared with the preset first threshold. If the second number is smaller than or equal to the preset first threshold, it is determined that the data on the page can be corrected by using the ECC, and the ECC recovery is performed on the data on the page according to the ECC data stored in the OOB space of the page.

Step 410: Acquire an idle storage block in the SSD, and move the data in the storage block to the idle storage block according to a fixed entry corresponding to the idle storage block; and the operation is completed.

Specifically, the idle storage block in the SSD is acquired. The data stored in the primary data space of the storage block and the ECC data stored in the OOB space of the storage block are moved to the acquired idle storage block. According to a storage position in the fixed entry corresponding to the idle storage block, data corresponding to the storage position is acquired from the data moved to the idle storage block, and stored in spare space in the idle storage block; and the operation is completed.

Further, the fixed entry corresponding to the storage block is replaced with in the temporary entry corresponding to the storage block. When data is written into the storage block next time, data backup is performed in the spare space in the storage block according to the storage positions stored in the replaced fixed entry.

When data on a certain page cannot be corrected by using a first ECC, after erroneous data is replaced with data stored in spare space, data on the page can be corrected by using a second ECC, and after the ECC recovery is performed on the data on the page, the system should be instructed to move the recovered data of the storage block to another idle storage block in idle time, so as to prevent more erroneous data in the storage block and cause that the data cannot be corrected by using a second ECC either. Meanwhile, after the data in the storage block is moved, a probability that the moved data cannot be corrected by using a first ECC is particularly small; therefore, only one ECC is required for reading the moved data, which may greatly increase efficiency.

Step 411: If the second number is greater than the preset first threshold, label the storage block as a bad block and, according to the page identity of the page, acquire data from a preset number of storage blocks.

Specifically, if the second number is greater than the preset first threshold, the storage block is labeled as a bad block and, according to the page identity of the page, a page having a same page identity as that of the page is acquired from the preset number of storage blocks, and data is read from the acquired page.

Step 412: Determine whether to perform a RAID recovery on the data on the page according to the acquired data; if it is determined to perform a RAID recovery on the data on the page according to the acquired data, perform a RAID recovery on the data on the page; and the operation is completed.

Specifically, an error check is performed on the acquired data and an error check is performed on the data on the page that has a same page identity as that of the page and is in a RAID redundant storage block. If the data on the page that corresponds to the page identity and is in the RAID redundant storage block can be corrected by using the ECC, the number of pieces of data that cannot be corrected by using the ECC is counted, where the data is on a page that corresponds to the page identity and is in the preset number of storage blocks. If the number of the data that cannot be corrected by using the ECC is smaller than or equal to a preset second threshold, it is determined that a RAID recovery can be performed on the data on the page. A RAID recovery is performed on the data on the page in the storage block according to the data on the page in the RAID redundant storage block; and the operation is completed.

A RAID check is performed in advance on the data on the page that has a same page identity and is in the preset number of storage blocks, and a check result is stored on the page that corresponds to the page identity and is in the RAID redundant storage block corresponding to the preset number of storage blocks.

Further, if the number of pieces of data that cannot be corrected by using the ECC is greater than the preset second threshold, it is determined that a RAID recovery cannot be performed on the data on the page. Reading of the data on the page is wrong, and the operation is completed.

For example, the second number of pieces of the erroneous data on the second page in the storage block is 20, and the preset first threshold is 5; because the second number is greater than the preset first threshold, the storage block is labeled as a bad block. It is assumed that the preset number is 16, and the preset second threshold is 3, then data on the second page in 16 storage blocks is acquired, an error check is performed on the acquired data on the second page of each storage block, and an error check is performed on the data on the second page in the RAID redundant storage block. If the data on the second page in the RAID redundant storage block can be corrected by using the ECC, and the number of pieces of data that is on the second page in the 16 storage blocks and cannot be corrected by using the ECC is 2, which is smaller than the preset second threshold 3, it is determined that a RAID recovery can be performed on the data on the page. A RAID recovery is performed on the data on the second page in the storage block according to the data on the second page in the RAID redundant storage block, and correct data is returned.

In the embodiment of the present invention, when data in the storage block is read, a first error check is performed on data on a certain page in the storage block. When the data on the page cannot be corrected by using the a first ECC, erroneous data is replaced with data stored in spare space of the storage block, and a second error check is performed on the data on the page. When the data on the page cannot be corrected by using the ECC again, a RAID recovery is performed. Data having a high error probability is stored in the spare space of OOB space of each page, which not only makes full use of the OOB space, but also replaces the erroneous data with the data stored in the spare space of each page. In addition, a second error check is performed, which may greatly decrease a probability of occurrence of uncorrectable faults, so as to avoid simply labeling the storage block as a bad block.

Figure 5:
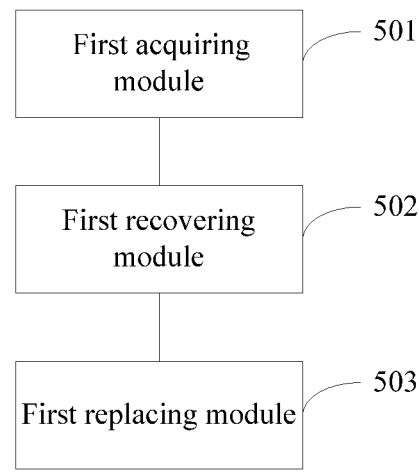
FIG. 5 is a schematic structural diagram of an apparatus for recovering erroneous data according to an embodiment of the present invention.

With reference to FIG. 5, an embodiment of the present invention provides an apparatus for recovering erroneous data. The apparatus includes: a first acquiring module 501 configured to, when data in a storage block that is included in an SSD is read, perform a first error check on data on a certain page of the storage block to acquire erroneous data on the page; a first recovering module 502 configured to, if a first number of pieces of the erroneous data on the page is smaller than or equal to a preset first threshold, perform an ECC recovery on the data on the page; and a first replacing module 503 configured to, if the first number is greater than the preset first threshold, acquire data from spare space according to a storage position of the erroneous data on the page and a fixed entry corresponding to the storage block, and replace the erroneous data on the page with the acquired data, where the fixed entry includes a storage position of each data stored in the spare space.

The device further includes: a second acquiring module configured to perform a second error check on the data on the page to acquire the erroneous data on the page; a second recovering module configured to, if a second number of pieces of the erroneous data on the page is smaller than or equal to the preset first threshold, perform the ECC recovery on the data on the page; a labeling module configured to, if the second number is greater than the preset first threshold, label the storage block as a bad block and, according to a page identity of the page, acquire data from a preset number of storage blocks; and a third recovering module configured to determine whether to perform a RAID recovery on the data on the page according to the acquired data; and if it is determined to perform a RAID recovery on the data on the page according to the acquired data, perform a RAID recovery on the data on the page.

The device further includes: a third acquiring module configured to acquire a storage position of erroneous data on each page in the storage block; a first counting module configured to acquire erroneous data in a same storage position, and count the number of errors in the erroneous data in a same storage position; and a first storing module configured to select a first preset number of storage positions with the greatest number of errors, and store the selected storage positions in a temporary entry corresponding to the storage block.

The device further includes: a fourth acquiring module configured to acquire erroneous data in each storage position on the page; a second counting module configured to count the number of errors in the erroneous data in each storage position on the page according to the erroneous data in each storage position on the page; and a second storing module configured to select a first preset number of storage positions with the greatest number of errors, and store the selected storage positions and a page identity of the page in a temporary entry corresponding to the storage block.

The device further includes: a fifth acquiring module configured to acquire a storage position of erroneous data on each page in the storage block; a third counting module configured to acquire erroneous data in a same storage position, and count the number of errors in the erroneous data in a same storage position; and a third storing module configured to select a second preset number of storage positions from the storage positions of the erroneous data in the storage block according to the number of errors counted, and store the selected storage positions and a page identity corresponding to the selected storage positions in a temporary entry corresponding to the storage block.

The device further includes a moving module configured to acquire an idle storage block in the SSD, and move the data in the storage block to the idle storage block according to a fixed entry corresponding to the idle storage block.

The device further includes a second replacing module configured to replace the fixed entry corresponding to the storage block with the temporary entry corresponding to the storage block.

In the embodiment of the present invention, a first error check is performed on data on a certain page of a storage block. When data on the page cannot be corrected by using a first ECC, erroneous data is replaced with data stored in spare space of the page. Data having a high error probability is stored in the spare space of OOB space of each page, which not only makes full use of the OOB space, but also replaces the erroneous data with the data stored in the spare space of the page. A probability of occurrence of uncorrectable faults may be greatly decreased, so as to avoid simply labeling the storage block as a bad block.

Figure 6:
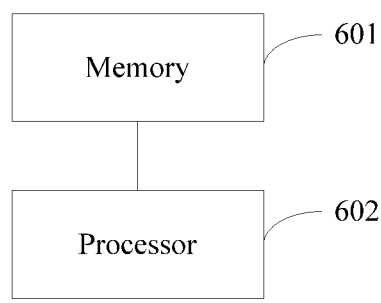
FIG. 6 is a schematic structural diagram of another apparatus for recovering erroneous data according to an embodiment of the present invention.

With reference to FIG. 6, an embodiment of the present invention provides a device for recovering erroneous data. The device includes a memory 601 and a processor 602 configured to perform a method for recovering erroneous data as follows: when data in a storage block that is included in an SSD is read, performing a first error check on data on a certain page of the storage block to acquire erroneous data on the page; if a first number of pieces of the erroneous data on the page is smaller than or equal to a preset first threshold, performing an ECC recovery on the data on the page; and if the first number is greater than the preset first threshold, acquiring data from spare space according to a storage position of the erroneous data on the page and a fixed entry corresponding to the storage block, and replacing the erroneous data on the page with the acquired data, where the fixed entry includes a storage position of each data stored in the spare space.

Further, after the acquiring data from spare space according to a storage position of the erroneous data on the page and a stored fixed entry, and replacing the erroneous data on the page with the acquired data if the first number is greater than the preset first threshold, the method further includes: performing a second error check on the data on the page to acquire the erroneous data on the page; if a second number of pieces of the erroneous data on the page is smaller than or equal to the preset first threshold, performing an ECC recovery on the data on the page; if the second number is greater than the preset first threshold, labeling the storage block as a bad block and, according to a page identity of the page, acquiring data from a preset number of storage blocks; and determining whether to perform a RAID recovery on the data on the page according to the acquired data; and if it is determined to perform a RAID recovery on the data on the page according to the acquired data, performing a RAID recovery on the data on the page.

Further, after the performing a first error check on data on a certain page of the storage block to acquire erroneous data on the page, the method further includes acquiring a storage position of erroneous data on each page in the storage block; acquiring erroneous data in a same storage position, and counting the number of errors in the erroneous data in a same storage position; and selecting a first preset number of storage positions with the greatest number of errors, and storing the selected storage positions in a temporary entry corresponding to the storage block.

Further, after the performing a first error check on data on a certain page of the storage block to acquire erroneous data on the page, the method further includes acquiring erroneous data in each storage position on the page; counting the number of errors in the erroneous data in each storage position on the page according to the erroneous data in each storage position on the page; and selecting a first preset number of storage positions with the greatest number of errors, and storing the selected storage positions and a page identity of the page in a temporary entry corresponding to the storage block.

Further, after the performing a first error check on data on a certain page of the storage block to acquire erroneous data on the page, the method further includes acquiring a storage position of erroneous data on each page in the storage block; acquiring erroneous data in a same storage position, and counting the number of errors in the erroneous data in a same storage position; and selecting a second preset number of storage positions from the storage positions of the erroneous data in the storage block according to the number of errors counted, and storing the selected storage positions and a page identity corresponding to the selected storage positions in a temporary entry corresponding to the storage block.

Further, after the performing an ECC recovery on the data on the page if a second number of pieces of the erroneous data on the page is smaller than or equal to the preset first threshold, the method further includes acquiring an idle storage block in the SSD, and moving the data in the storage block to the idle storage block according to a fixed entry corresponding to the idle storage block.

Further, the method further includes replacing the fixed entry corresponding to the storage block with the temporary entry corresponding to the storage block.

In the embodiment of the present invention, a first error check is performed on data on a certain page of the storage block. When data on the page cannot be corrected by using a first ECC, erroneous data is replaced with data stored in spare space of the page. Data having a high error probability is stored in the spare space of OOB space of each page, which not only makes full use of the OOB space, but also replaces the erroneous data with the data stored in the spare space of the page. A probability of occurrence of uncorrectable faults may be greatly decreased, so as to avoid simply labeling the storage block as a bad block.

It should be noted that, the division of the foregoing functional modules is merely used as an example for description when the device for recovering erroneous data provided by the foregoing embodiment recovers data. In an actual application, the foregoing functions may be assigned to different functional modules for completion according to a requirement. That is, an internal structure of the device may be divided into different functional modules so as to complete all or part of the functions described above. Moreover, the device for recovering erroneous data provided by the foregoing embodiment and method embodiments for recovering erroneous data belong to the same inventive concept, of which a specific implementation process is described in the method embodiments in detail, and are not repeatedly described herein.

The sequence numbers of the foregoing embodiments of the present invention are merely for description purpose but do not indicate the preference of the embodiments.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, or an optical disc.

The foregoing descriptions are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for recovering erroneous data, comprising:
performing a first error check on data on a certain page of a storage block to acquire erroneous data on the page when data in the storage block that is comprised in a solid state disk is read;
performing an error checking and correction (ECC) recovery on the data on the page when a first number of pieces of the erroneous data on the page is smaller than or equal to a preset first threshold; and
acquiring data from spare space according to a storage position of the erroneous data on the page and a fixed entry corresponding to the storage block when the first number is greater than the preset first threshold; and
replacing the erroneous data on the page with the acquired data when the first number is greater than the preset first threshold,
wherein the fixed entry comprises a storage position of each data stored in the spare space.

2. The method according to claim 1, wherein after acquiring the data from the spare space according to the storage position of the erroneous data on the page and the fixed entry corresponding to the storage block, and replacing the erroneous data on the page with the acquired data when the first number is greater than the preset first threshold, the method further comprises:
performing a second error check on the data on the page to acquire the erroneous data on the page;
performing an ECC recovery on the data on the page when a second number of pieces of erroneous data on the page is smaller than or equal to the preset first threshold;
labeling the storage block as a bad block when the second number is greater than the preset first threshold;
acquiring data from a preset number of storage blocks according to a page identity of the page when the second number is greater than the preset first threshold;
determining whether to perform a redundant array of independent disks (RAID) recovery on the data on the page according to the acquired data; and
performing a RAID recovery on the data on the page when a determination is made to perform the RAID recovery on the data on the page according to the acquired data.

3. The method according to claim 1, wherein after performing the first error check on the data on the certain page of the storage block to acquire the erroneous data on the page, the method further comprises:
acquiring a storage position of erroneous data on each page in the storage block;
acquiring erroneous data in a same storage position;
counting the number of errors in the erroneous data in a same storage position;
selecting a first preset number of storage positions with the greatest number of errors; and
storing the selected storage positions in a temporary entry corresponding to the storage block.

4. The method according to claim 1, wherein after performing the first error check on the data on the certain page of the storage block to acquire the erroneous data on the page, the method further comprises:
acquiring erroneous data in each storage position on the page;
counting the number of errors in the erroneous data in each storage position on the page according to the erroneous data in each storage position on the page;
selecting a first preset number of storage positions with the greatest number of errors; and
storing the selected storage positions and a page identity of the page in a temporary entry corresponding to the storage block.

5. The method according to claim 1, wherein after performing the first error check on the data on the certain page of the storage block to acquire the erroneous data on the page, the method further comprises:

acquiring a storage position of erroneous data on each page in the storage block;

acquiring erroneous data in a same storage position;

counting the number of errors in the erroneous data in a same storage position;

selecting a second preset number of storage positions from the storage positions of the erroneous data in the storage block according to the number of errors counted; and storing the selected storage positions and a page identity corresponding to the selected storage positions in a temporary entry corresponding to the storage block.

6. The method according to claim 1, wherein after performing the ECC recovery on the data on the page when the second number of pieces of the erroneous data on the page is smaller than or equal to the preset first threshold, the method further comprises:

acquiring an idle storage block in the solid state disk; and moving the data in the storage block to the idle storage block according to a fixed entry corresponding to the idle storage block.

7. The method according to claim 6, further comprising replacing the fixed entry corresponding to the storage block with the temporary entry corresponding to the storage block.

8. A device for recovering erroneous data, comprising:

a first acquiring module configured to perform a first error check on data on a certain page of a storage block to acquire erroneous data on the page when the data in the storage block that is comprised in a solid state disk is read;

a first recovering module configured to perform an error checking and correction (ECC) recovery on the data on the page when a first number of pieces of the erroneous data on the page is smaller than or equal to a preset first threshold; and a first replacing module configured to acquire data from spare space according to a storage position of the erroneous data on the page and a fixed entry corresponding to the storage block when the first number is greater than the preset first threshold, and replace the erroneous data on the page with the acquired data when the first number is greater than the preset first threshold, wherein the fixed entry comprises a storage position of each data stored in the spare space.

9. The device according to claim 8, further comprising:

a second acquiring module configured to perform a second error check on the data on the page to acquire the erroneous data on the page;

a second recovering module configured to perform the ECC recovery on the data on the page when a second number of pieces of the erroneous data on the page is smaller than or equal to the preset first threshold;

a labeling module configured to label the storage block as bad when the second number is greater than the preset first threshold, and acquire data from a preset number of storage blocks according to a page identity of the page when the second number is greater than the preset first threshold; and a third recovering module configured to determine whether to perform a redundant array of independent disks (RAID) recovery on the data on the page according to the acquired data, and perform a RAID recovery on the data on the page when a determination is made to perform the RAID recovery on the data on the page according to the acquired data.

10. The device according to claim 8, further comprising:

a third acquiring module configured to acquire a storage position of erroneous data on each page in the storage block;

a first counting module configured to acquire erroneous data in a same storage position, and count the number of errors in the erroneous data in a same storage position; and a first storing module configured to select a first preset number of storage positions with the greatest number of errors, and store the selected storage positions in a temporary entry corresponding to the storage block.

11. The device according to claim 8, further comprising:

a fourth acquiring module configured to acquire erroneous data in each storage position on the page;

a second counting module configured to count the number of errors in the erroneous data in each storage position on the page according to the erroneous data in each storage position on the page; and a second storing module configured to select a first preset number of storage positions with the greatest number of errors, and store the selected storage positions and a page identity of the page in a temporary entry corresponding to the storage block.

12. The device according to claim 8, further comprising:

a fifth acquiring module configured to acquire a storage position of erroneous data on each page in the storage block;

a third counting module configured to acquire erroneous data in a same storage position, and count the number of errors in the erroneous data in a same storage position; and a third storing module configured to select a second preset number of storage positions from the storage positions of the erroneous data in the storage block according to the number of errors counted, and store the selected storage positions and a page identity corresponding to the selected storage positions in a temporary entry corresponding to the storage block.

13. The device according to claim 8, further comprising a moving module configured to acquire an idle storage block in the solid state disk, and move the data in the storage block to the idle storage block according to a fixed entry corresponding to the idle storage block.

14. The device according to claim 13, further comprising a second replacing module configured to replace the fixed entry corresponding to the storage block with the temporary entry corresponding to the storage block.

15. A device for recovering erroneous data, comprising:

a memory storing instructions; and a processor coupled to the memory, wherein the instructions executed by the processor cause the device to:

perform a first error check on data on a certain page of a storage block to acquire erroneous data on the page when the data in the storage block that is comprised in a solid state disk is read;

perform an error checking and correction (ECC) recovery on the data on the page when a first number of pieces of the erroneous data on the page is smaller than or equal to a preset first threshold; and acquire data from spare space according to a storage position of the erroneous data on the page and a fixed entry corresponding to the storage block when the first number is greater than the preset first threshold; and replace the erroneous data on the page with the acquired data when the first number is greater than the preset first threshold, wherein the fixed entry comprises a storage position of each data stored in the spare space.

16. The device according to claim 15, wherein after acquiring the data from the spare space according to the storage position of the erroneous data on the page and the fixed entry corresponding to the storage block, and replacing the erroneous data on the page with the acquired data when the first number is greater than the preset first threshold, the device is configured to:
perform a second error check on the data on the page to acquire the erroneous data on the page;
perform an ECC recovery on the data on the page when a second number of pieces of the erroneous data on the page is smaller than or equal to the preset first threshold;
label the storage block as a bad block when the second number is greater than the preset first threshold;
acquire data from a preset number of storage blocks according to a page identity of the page when the second number is greater than the preset first threshold;
determine whether to perform a redundant array of independent disks (RAID) recovery on the data on the page according to the acquired data; and
perform the RAID recovery on the data on the page when a determination is made to perform the RAID recovery on the data on the page according to the acquired data.

17. The device according to claim 15, wherein after performing the first error check on the data on the certain page of the storage block to acquire the erroneous data on the page, the device is configured to:
acquire a storage position of erroneous data on each page in the storage block;
acquire erroneous data in a same storage position;
count the number of errors in the erroneous data in a same storage position;
select a first preset number of storage positions with the greatest number of errors; and
store the selected storage positions in a temporary entry corresponding to the storage block.

18. The device according to claim 15, wherein after performing the first error check on the data on the certain page of the storage block to acquire the erroneous data on the page, the device is configured to:
acquire erroneous data in each storage position on the page;
count the number of errors in the erroneous data in each storage position on the page according to the erroneous data in each storage position on the page;
select a first preset number of storage positions with the greatest number of errors; and
store the selected storage positions and a page identity of the page in a temporary entry corresponding to the storage block.

19. The device according to claim 15, wherein after performing the first error check on the data on the certain page of the storage block to acquire the erroneous data on the page, the device is configured to:
acquire a storage position of erroneous data on each page in the storage block;
acquire erroneous data in a same storage position;
count the number of errors in the erroneous data in a same storage position;
select a second preset number of storage positions from the storage positions of the erroneous data in the storage block according to the number of errors counted; and
store the selected storage positions and a page identity corresponding to the selected storage positions in a temporary entry corresponding to the storage block.

20. The device according to claim 15, wherein after performing the ECC recovery on the data on the page when the second number of pieces of the erroneous data on the page is smaller than or equal to the preset first threshold, the device is configured to:
acquire an idle storage block in the solid state disk; and
move the data in the storage block to the idle storage block according to a fixed entry corresponding to the idle storage block.

* * * * *

UNITED STATES PATENT AND TRADEMARK OFFICE
CERTIFICATE OF CORRECTION

PATENT NO. : 9,280,301 B2
APPLICATION NO. : 14/501368
DATED : March 8, 2016
INVENTOR(S) : Huiqiang Bao et al.

Page 1 of 1

It is certified that error appears in the above-identified patent and that said Letters Patent is hereby corrected as shown below:

On title page 2, col. 2, line 5, References Cited, Other Publications should read:

Foreign Communication From A Counterpart Application, PCT Application No. PCT/CN2014/073234, International Search Report dated June 11, 2014, 7 pages.

Signed and Sealed this
Twenty-first Day of June, 2016

Michelle K. Lee
*Director of the United States Patent and Trademark Office*